G. J. BURKHARDT.
ENGINE STARTING DEVICE.
APPLICATION FILED OCT. 2, 1911.
1,076,660.
Patented Oct. 28, 1913.
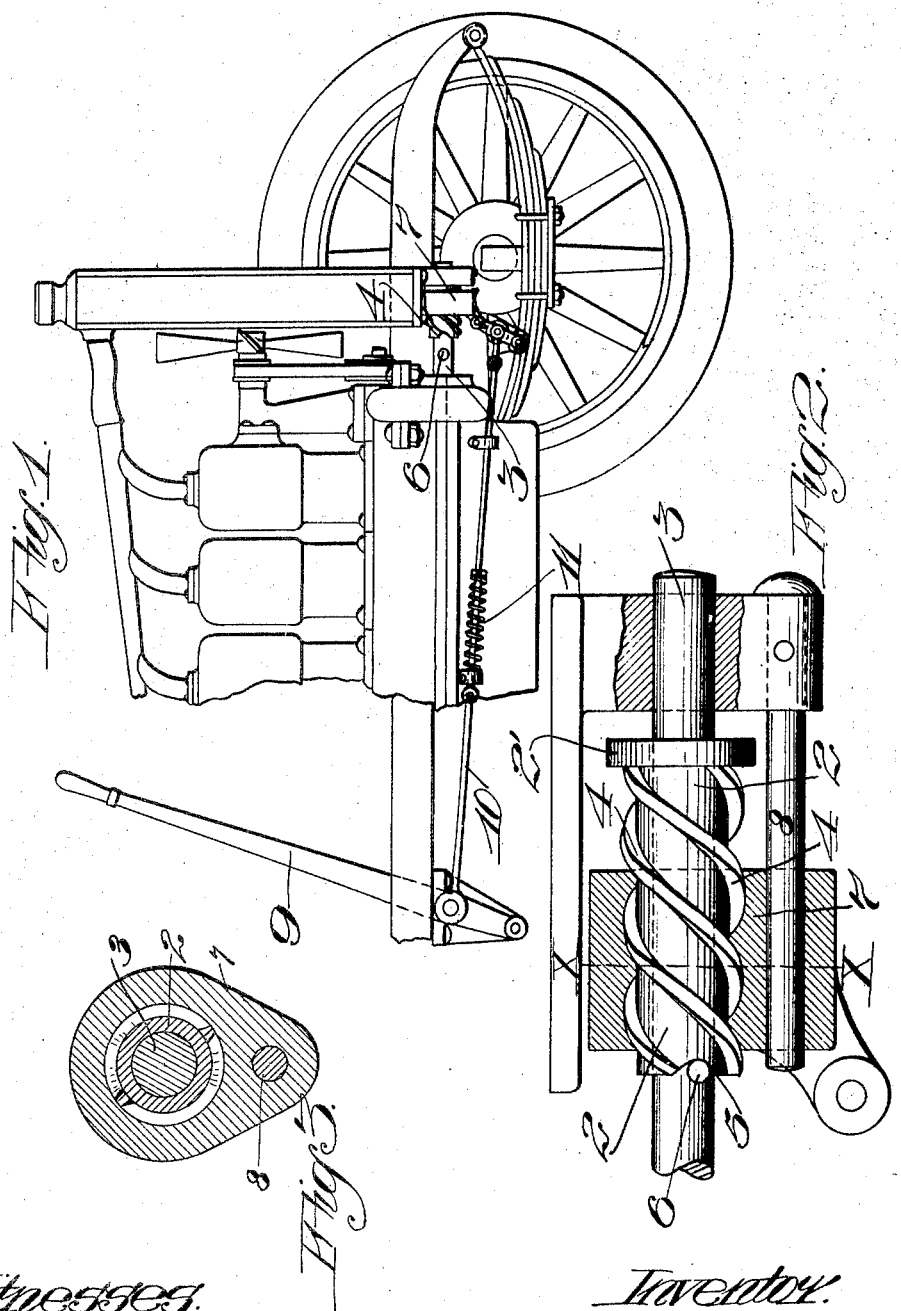

UNITED STATES PATENT OFFICE.

GEORGE J. BURKHARDT, OF BURLINGAME, CALIFORNIA.

ENGINE-STARTING DEVICE.

1,076,660.  Specification of Letters Patent.  Patented Oct. 28, 1913.

Application filed October 2, 1911. Serial No. 652,343.

*To all whom it may concern:*

Be it known that I, GEORGE J. BURKHARDT, a citizen of the United States, residing at Burlingame, in the county of San Mateo and State of California, have invented new and useful Improvements in Engine-Starting Devices, of which the following is a specification.

This invention relates to apparatus for starting internal combustion engines.

The object of the invention is to devise and provide an engine starting device of substantial construction, easy operation, of few parts and such design that the engine may be started from any convenient position or location without cranking and thus avoiding injury to operators.

The invention consists of the parts and the construction and combination of parts as hereinafter more fully described and claimed, having reference to the accompanying drawings, in which—

Figure 1 is a partial sectional view showing the device in position upon an engine. Fig. 2 is a longitudinal section of same. Fig. 3 is a cross section on line X—X.

The present form of my starter comprises a sleeve 2 slidable upon a shaft 3 of an engine. The sleeve is provided with external spiral threads 4 of desired pitch and one end of the sleeve is formed with clutch teeth 5, capable of engaging one or more projections 6 on the shaft 3.

The sleeve or clutch member 2 is surrounded by a nut 7 slidable upon rigid guides 8 and also movable longitudinally with and relative the sleeve 2 which has a stop or flange 2' at one end.

The longitudinal movement of the nut may be accomplished by operation of a lever 9 connected by link 10 to the nut 7 and the initial movement of the nut first slides the sleeve 2 along the shaft until the clutch teeth encounter the projections 6 after which further shifting of the nut imparts a rotary motion to the sleeve and consequently turns the shaft to start the engine. Should the engine speed up the projections 6, pushing against the inclined surface of the teeth, force the sleeve away into inoperative position.

The extreme simplicity, inexpensive construction, strength of parts and positiveness of action, are important and valuable objects for which this invention is devised.

If desired, a spring 11 may be connected to one of the parts to maintain the sleeve 2 free of the projections 6 on the engine shaft.

The nut is adapted to shift along the sleeve until it engages the flange 2' when further movement of the parts will be uniform.

Having thus described my invention, what I claim and desire to secure by Letters Patent is—

An engine starting device comprising in combination a sleeve, an engine shaft upon which said sleeve is rotatably and slidably mounted, a bracket providing a bearing for said shaft, threaded members upon the exterior of said sleeve, a nut coöperating with said threaded members, a guide carried by said bracket and adapted to prevent said actuating nut from rotating, projections fixedly mounted upon said shaft, clutch teeth upon said sleeve adapted to coöperate with said projections, and means for sliding said nut upon said guide to rotate said sleeve.

In testimony whereof I have hereunto set my hand in the presence of two subscribing witnesses.

GEORGE J. BURKHARDT.

Witnesses:
ZETA HASTINGS,
CHARLES EDELMAN.

---

Copies of this patent may be obtained for five cents each, by addressing the "Commissioner of Patents, Washington, D. C."